No. 698,320. Patented Apr. 22, 1902.
A. REINLE.
SHOW CASE.
(Application filed Dec. 2, 1901.)
(No Model.)
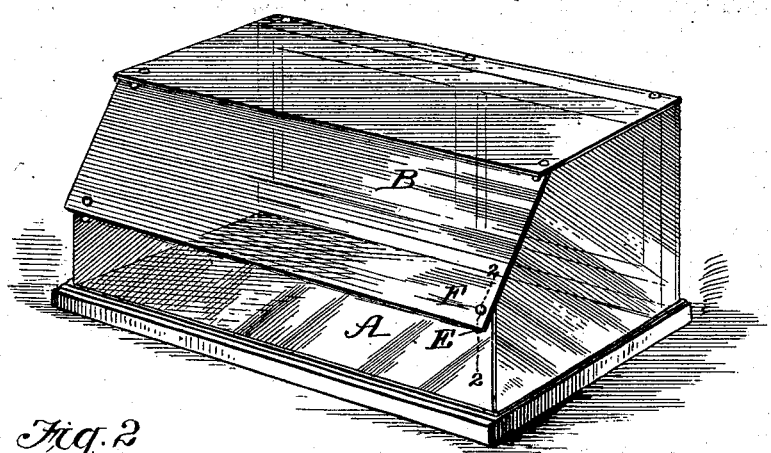
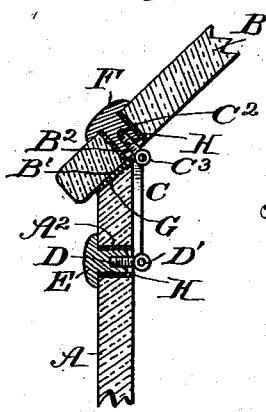 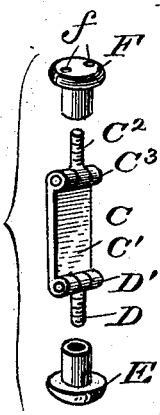
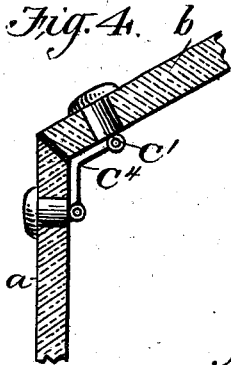
WITNESSES:
Jos. A. Ryan
Perry B. Turpin
INVENTOR
August Reinle.
BY Munn & Co.
ATTORNEYS

UNITED STATES PATENT OFFICE.

AUGUST REINLE, OF BALTIMORE, MARYLAND.

SHOW-CASE.

SPECIFICATION forming part of Letters Patent No. 698,320, dated April 22, 1902.

Application filed December 2, 1901. Serial No. 84,384. (No model.)

*To all whom it may concern:*

Be it known that I, AUGUST REINLE, a citizen of the United States, residing at Baltimore, in the State of Maryland, have made certain new and useful Improvements in Show-Cases, of which the following is a specification.

My invention is an improvement in showcases, and has for an object to provide a novel construction for uniting the adjoining plates of the so-called "all-glass" show-cases; and the invention consists in certain novel constructions and combinations of parts, as will be hereinafter described and claimed.

In the drawings, Figure 1 is a perspective view of a show-case provided with my improvements. Fig. 2 is a detail vertical section on about line 2 2 of Fig. 1. Fig. 3 is a detail perspective view illustrating the several parts of the fastening devices, and Fig. 4 represents the fastening devices applied to two plates having a miter-joint.

In constructing cases of the form shown in Figs. 1 and 2 the angle between the plate A and the plate B, which overlaps the plate A, as shown at B', varies in different cases. I find it desirable in making the connecting-bracket C to provide the main plate C' at one end with a threaded stud $C^2$, which is hinged at $C^3$ to the end of the plate C', the opposite stud D being also preferably hinged at D' to the other end of the plate C', so the bracket can be reversed end for end and either of its end studs be set at any angle desired to the main plate C', according to the angle between the plates A and B. The plate C' is malleable, being preferably made of brass and nickel-plated, so it can be conveniently bent to any angle desired—such, for instance, as shown in Fig. 4, wherein the plate C is bent at $C^4$ to coincide with the angle between the plates *a* and *b*.

In the application of a connecting-bracket as shown in Fig. 2 the plates A and B are provided at $A^2$ and $B^2$ with openings to receive the fastening-nuts E and F, and the studs D and $C^2$ extend within the openings $A^2$ and $B^2$ and receive the said nuts E and F, as shown, felt or other suitable lining G being provided between the contacting portions of the plates A and B and rubber or other suitable bushings H being supplied surrounding the nuts E and F, as shown in Fig. 2. The nuts may be provided with the pair of sockets *f* to receive the pins of a thumb-wrench, or the said nuts may be turned in any other way desired. By the described construction of connecting-bracket I am able to connect plates, such as A and B, arranged at any suitable angle and to bring the studs D and $C^2$ in alinement with the openings for their respective nuts and also to apply the bracket to constructions such as shown in Fig. 4, with the plates *a* and *b* mitered together; also, by pivoting and hinging both studs D and $C^2$ to the plate C', as is preferred, the bracket can be used end for end, as may be desired.

As shown in Fig. 3, the hinged knuckles on the plate C' are arranged entirely in advance of the outer surface of the said plate, so the plate C' can rest flat throughout its length against the surface of the plate A, as shown in Fig. 2.

It will be understood that my invention is useful in show-cases and show-windows, which latter may be regarded as show-cases and are intended to be included in the term "show-case" as employed in this specification and the appended claims.

It will be noticed from Fig. 2 that the fastening device may be applied to secure two plates of glass regardless of the angle of such plates to each other and with the threaded stud $C^2$ at a right angle to the plane of the plate B, which it penetrates. This is important, as I am able thereby to drill the holes in the glass at a right angle to the plane of the glass plate and readily adjust the stud $C^2$ to extend in alinement with the hole in the plate.

Having thus described my invention, what I claim as new, and desire to secure by Letters Patent, is—

1. The combination in a show-case, of the adjoining plates, one of which is arranged to overlap the other at an angle, said plates being provided with openings for the studs and fastening-nuts, the connecting-bracket composed of the main plate and the threaded studs hinged to the main plate at the opposite ends of the latter, the hinge-knuckles on the main plate being arranged entirely in advance of the outer surface of the main plate, whereby the latter may rest flat throughout its length against the surface of the glass and the nuts turned on the said studs within the openings in the glass plates, substantially as set forth.

2. A fastening or connecting bracket for show-cases comprising the main plate, the threaded stud at one end of the main plate, and the threaded stud hinged to the main plate at the opposite end of the latter, whereby it may be turned into alinement with or at any desired angle to the main plate, substantially as set forth.

3. In a show-case the improved fastening or connecting bracket for uniting the adjoining plates of the case consisting of the main plate, and the threaded studs hinged at one end to the main plate at the opposite ends of the latter, whereby they may be turned into alinement with or at any desired angle to the main plate, substantially as set forth.

4. A fastening device for glass plates comprising a plate and a stud hinged thereto at the end of said plate whereby the fastening can be applied to connect two plates of glass at any desired angle to each other with the stud extending at a right angle to the plane of the glass plate it penetrates, substantially as set forth.

5. A fastening or connecting bracket for show-cases, comprising the main plate, and a threaded section hinged at one end to the main plate at one end of the latter, whereby the said threaded section may be adjusted into alinement with or at an angle to the main plate, substantially as set forth.

AUGUST REINLE.

Witnesses:
SOLON C. KEMON,
PERRY B. TURPIN.